United States Patent Office 3,362,058
Patented Jan. 9, 1968

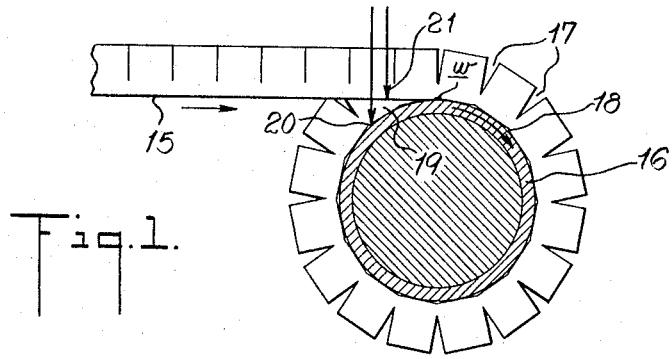
Fig. 1.
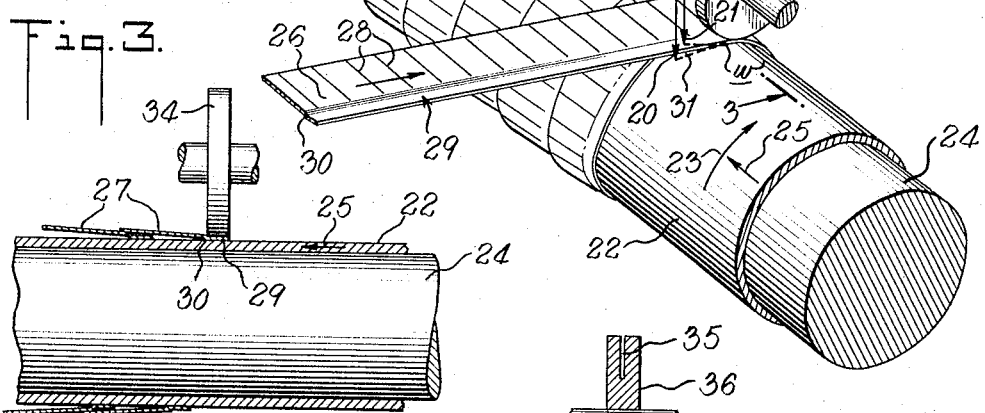
Fig. 2.
Fig. 3.
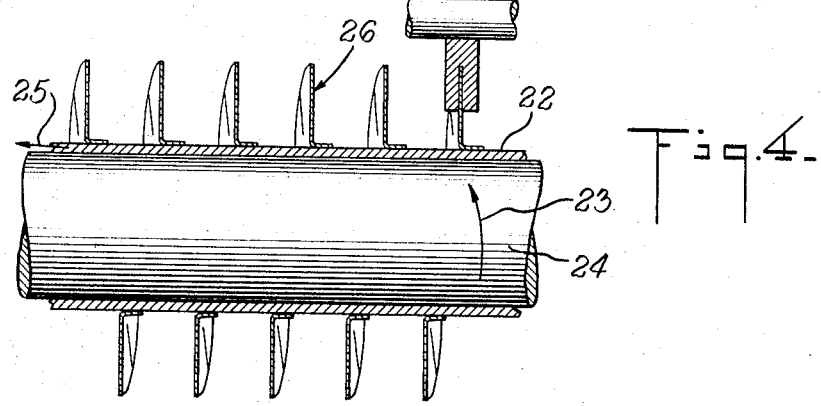
Fig. 4.

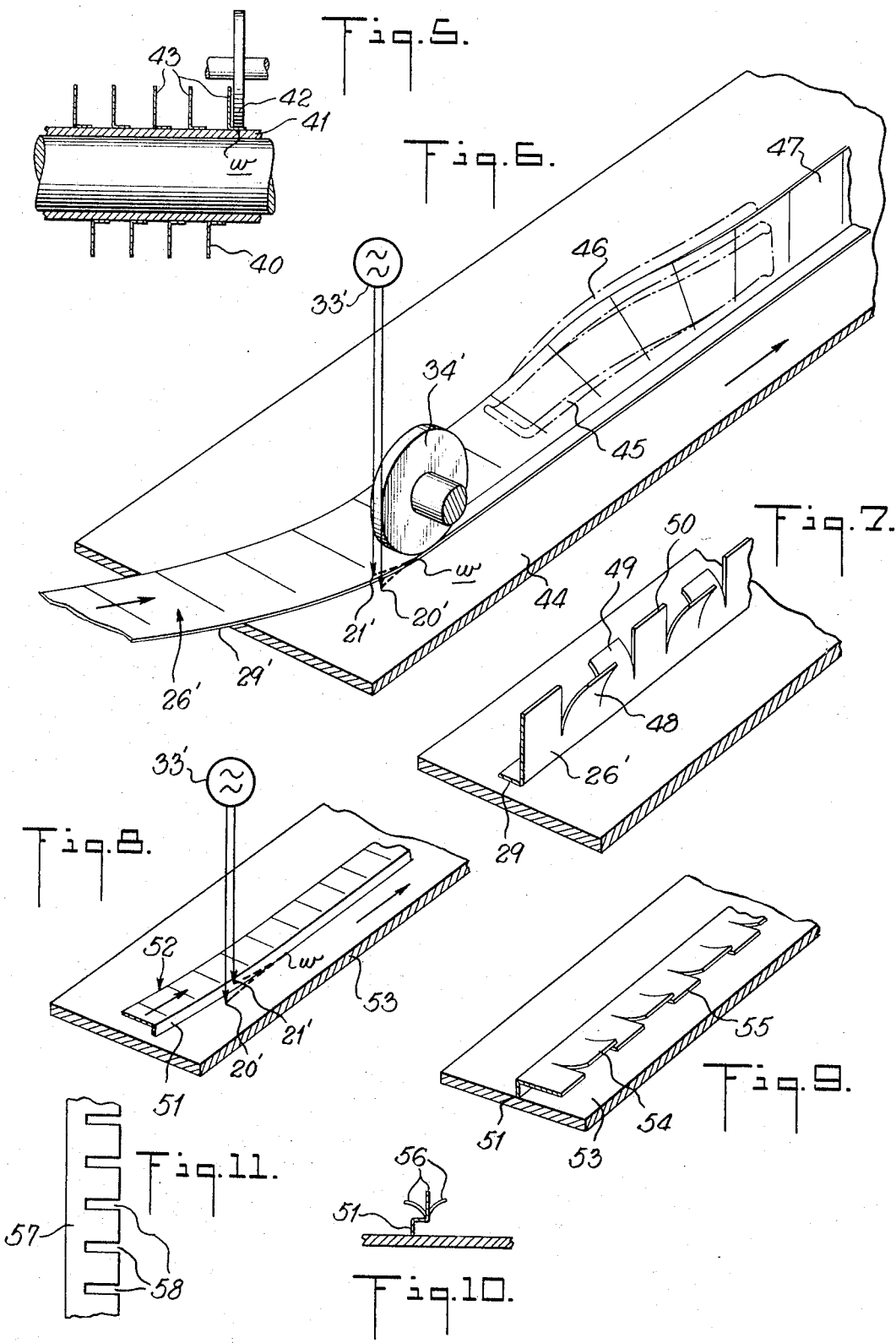

3,362,058
WELDING METAL FINS IN PLACE
Jack Morris, Monsey, and Wallace C. Rudd, Larchmont, N.Y., assignors to American Machine & Foundry Company, New York, N.Y., a corporation of New Jersey
Filed Jan. 5, 1965, Ser. No. 423,457
6 Claims. (Cl. 29—157.3)

ABSTRACT OF THE DISCLOSURE

In the electric welding together of a metal strip, particularly a slitted strip, to a member to form a fin on the member, the strip is brought into contact with the member at an angle so as to form a V-gap in advance of the weld point and the greater cross-sectional dimension of the strip, and a face thereof corresponding thereto, are maintained relatively close and generally parallel to the surface of the member to which the edge portion is to be welded up to and at the weld point, and thereafter the strip is deflected to an angle with respect to the member. High frequency welding current is supplied to the strip edge and the member in advance of the weld point.

---

This invention relates to the welding of fin-like metal strip material, such as adapted for heat transfer purposes or otherwise, to tubing or other metal surfaces.

It is a well-known practice to weld elongated strips or fin-like material on edge to other metal members, such for example as the welding of fin material on tubing, either in the form of helical convolutions or in the form of fins extending longitudinally of the tubing, or extending along on surfaces of other metal members, which may be either curved or flat. A highly efficient way of rapidly accomplishing such welding is by the use of high frequency heating current for heating the two members which are to be welded together up to welding temperature along the desired seam line as the members are rapidly advanced and brought together at a weld point. Preferably the heating current is so applied as to be highly concentrated on the opposite sides of a V-shaped gap having its apex at the weld point. This in turn generally involves having one or both edges of such gap of curved form, either by way of advancing the strip of fin material along a curved path to the weld point, or by way of providing the other member in a form having a curved surface.

If the strip of fin material is to be welded on edge to another metal member which is curved, then the edge portions of the strip opposite the edge to be welded, will have to stretch, or the edge portions which are to be welded will have to become contracted or wrinkled in order for the strip on edge to conform to and be welded to the curved surface. This involves considerable difficulties in so controlling the position and condition of the strip as to facilitate uniform welding without wrinkling or otherwise objectionably deforming the strip. On the other hand, if the strip is to be welded on edge to a flat surface, and if the strip is brought on edge into engagement with such surface by following a curvilinear path to provide the above-mentioned V-shaped gap prior to the weld point, then this also involves similar difficulties due to the tendency of the strip either to be stretched on the edge portions which are to be welded in place, or compressed or wrinkled along the opposite edge portions.

Furthermore, oftentimes it is desired that the fin-forming strip be slitted or slotted transversely, except at the edge portions which are to be welded in place, such slits or slots permitting short portions of the strip to be either twisted or deflected to one side or the other in order to provide more effective radiating surfaces, or to promote turbulence in the surrounding heat transferring fluid. But when such slit or slotted fin strip material is so advanced that its said edge to be welded will form one side of the above-mentioned V-shaped gap, then by reason of the presence of the slits, said edge will not tend to conform to a continuous smooth line in approaching the weld point, but instead will tend to conform to a succession of short straight lines, each at a slight angle with respect to the next succeeding one, so that the two sides of the V-shaped gap abovementioned, will not smoothly merge at the weld point, but the dimensions of the gap and the position of its apex, viz the weld point, will vary slightly and intermittently as a result of the presence of the slits in the strip, and this in turn will cause irregularities in the weld, all as more fully explained hereinafter.

However, by utilizing the present invention, all of the above-explained difficulties may be avoided in novel ways and with surprising effectiveness, so that either plain, slitted or slotted strip material may be uniformly and rapidly welded and in effect positioned and secured on edge with respect to another metal member. This is accomplished by so positioning the edge portions of the strip which are to be welded in place, that same will in effect approach the weld point flatwise along a smooth uniform path, while those other portions of the strip, whether unslitted or slitted, are so positioned that same cannot influence and change such uniform smooth path of movement. Thereafter the slitted portions of the strip are repositioned or deflected to the extent necessary to provide the predetermined desired relationship of the fin matrial to the support member to which same is welded. The method and means of this invention for accomplishing this result will be further described and explained hereinafter.

While preferably the high frequency heating current in accordance with the invention, is applied by contacts engaging the workpieces respectively at opposite sides of the above-mentioned V-shaped gap shortly in advance of the weld point so that the current flows from such points along the gap edges to and from the weld point, yet, if preferred, in some cases the high frequency current may be applied inductively by the use of coils or inductors of known forms.

It is to be understood that the terms "slits" and "slitted" as used hereinafter, are, for convenience, to be taken as having reference as well to slots and slotted constructions.

Various further and more specific objects, features and advantages of the invention will appear from the description given below, taken in connection with the accompanying drawings, illustrating by way of example preferred forms of the invention.

In the drawings:

FIG. 1 is a cross-sectional view of a tubular member as carried on a rotating mandrel, and onto which a slitted fin strip is being wound in position for welding, this view illustrating the manner in which the unslitted edge portions of the strip which are to be welded to the tubing, will tend to conform to a succession of short straight lines, each at a slight angle with respect to the next succeeding one, so that said edge will not follow a smoothly curved path as it becomes welded to the tubular member, the present invention being directed to means and methods for avoiding this effect;

FIG. 2 is a perspective and somewhat schematic view illustrating portions of a preferred embodiment of the invention as applied to the problem of welding a radiating fin to a tubular member;

FIG. 3 is a vertical sectional view taken substantially along line 3—3 of FIG. 2;

FIG. 4 is a vertical sectional view taken at a subsequent station where the helical convolutions of the fin material are being "combed" or so reshaped as to assume positions normally to the surface onto which the fin material is welded;

FIG. 5 is a somewhat schematic vertical sectional view of an alternative embodiment;

FIG. 6 is a somewhat schematic perspective view of an alternative embodiment of the invention as adapted for the welding of a fin strip along on an extended surface of another member which may be either flat, as shown, or, if desired, more or less curved either in the longitudinal or transverse directions with respect to the strip;

FIG. 7 is a view showing a fin strip welded in place as per FIG. 6 and which is thereafter, at various succeeding slit portions thereof, deflected to opposite sides for promoting increased radiation therefrom, or turbulence in the surrounding heat transferring fluid;

FIG. 8 is a somewhat schematic perspective view of a further embodiment of the invention;

FIG. 9 is a view of the fin strip as welded in accordance with FIG. 8, but showing same with succeeding portions thereof deflected between slits.

FIG. 10 is a vertical sectional view through an alternative for FIG. 9 and in which portions of the strip have been deflected in various other ways; and FIG. 11 shows a portion of a fin strip which, instead of being slitted, is formed with a succession of slots.

Referring to FIG. 1, there is here shown the manner in which a slitted fin strip, as at 15, will tend to become positioned about a rotating tubular member 16 when the strip on edge is brought into engagement tangentially with the tubing at an intended weld point $w$, so that the strip will form helical convolutions welded about the tubing. Because of the strip having been slitted, as it is wrapped on edge about the tubing, the forces will be such that the slits will readily open up, as at 17, whereas the unslit edge portions of the strip engaging the tubing, will tend to conform to a succession of straight lines at slight angles to each other, as indicated at 18, and thus where such angles occur, the strip edge will not be pressed into proper contact or engagement with the tubing to insure proper welding. Instead only the midportions of each of the straight edge portions will firmly engage the surface of the tubing. In advance of the desired weld point $w$, a generally V-shaped gap 19 will occur, and if contacts, as at 20, 21, connected to a source of high frequency current are applied, as indicated, to the opposite sides of this gap, the current therefrom will flow from the contacts along the two sides of the gap to and from the apex of the gap, but because of the angles, such as 18, which occur between successive portions of the strip edge, the actual position of the apex of the gap, and the pressure exerted between the parts thereof, will vary intermittently, thus varying the lengths of the current paths for the heating current, as well as the welding pressure.

Also, if the relationship of the parts is as per FIG. 1, except that a fin strip is used which is not slitted, it will be apparent that as it starts to form convolutions around the tubing 16, the outer edges will tend to be substantially stretched and the inner edge portions compressed, with resulting distortion or winkling and possible disturbance of the proper welding operation.

With the arrangement of apparatus in accordance with FIG. 2, these difficulties are avoided. Here a tubular member 22 is shown being suitably rotated in the direction indicated by the arrow 23 about a supporting mandrel or shaft 24, while being longitudinally advanced on the shaft in the direction indicated by the arrow 25. Meanwhile a strip 26 is being advanced and guided by any suitable means (not shown) into a generally tangential relation to the surface of the tube 22, so that it will become wound about the tube 22 and form a plurality of helically arranged convolutions, as at 27, which may be in somewhat overlapping relation, as shown in FIG. 3, or if desired, at such a greater pitch angle that same will not overlap. The strip 26 may either be plain and unslitted, or, when taking advantage of particularly desirable aspects of the invention, the strip may be formed with a succession of spaced-apart slits, as at 28, which slits, however, terminates before reaching the edge portions 29 of the strip. These edge portions 29 may either be flat and in the same plane as the remaining portions of the strip, or preferably same may be deflected downwardly somewhat, as indicated at 30, to form this edge of the strip as a flat band, well adapted to engage "flatwise" the other workpiece to be welded thereto.

As the strip is advanced, its portion 29 comes into engagement with the rotating and advancing tube 22 at a weld point $w$ (or strictly speaking, along a short line rather than a point) occurring at the apex of a gap 31 located between the surface of the tubing and the approaching strip edge portions. Contacts, as at 20, 21 are applied to the opposite sides of this gap in case the welding is to be accomplished by high frequency contact resistance heating, these contacts being connected to a suitable source of the high frequency current indicated symbolically at 33. Thus current will flow from the contacts along opposite sides of the gap 31 to and from the weld point $w$ for heating the approaching surfaces up to welding temperature upon reaching that point, which will now remain stationary, since the edge portions 29 of the strip follow a smooth and straight path to the weld point and thence a smoothly curved path along in contact with the surface of the rotating tube 22.

Conventional pressure roller means, as at 34, may be provided to press the strip into welded engagement with the tubing at the weld point. As is customary with high frequency resistance welding, the current used may have a frequency of about 50,000 cycles per second, or preferably from 300,000 to 400,000 cycles per second, or even higher. With this method of welding, only the very surface portions which come into contact at the weld point will become heated to welding temperature, and these heated areas will be closely confined to band-like areas which form the opposite sides or surfaces of the gap 31.

At a later point or station along the mandrel 24, the portions of the strip 26 which are not welded to the tubing, may, as shown in FIG. 4, be "combed" or deflected into positions so that the surface thereof will be normal to the axis of the tubing, or at any desired acute angle with respect thereto. This may be accomplished by causing the slitted portions of the strip to pass into and through a gap, as at 35, in a rotating disk 36. If necessary, and particularly if the strip is slit instead of being plain, several of such disks may be used in succession, each with more and more narrow gaps for finally confining the fin material to the particular position desired.

Thus a method and means is provided for securely and uniformly welding the fin strip along one edge portion thereof to a rotating tube or other rotating member, and this may be accomplished at very high speed without subjecting the remaining portions of the strip either to stretching or compressive stresses, as would be the case if the strip were not advanced to the welding location with all of its portions more or less along a plane at right angles to the desired final upstanding position of the welded fin material. And, after the strip edge 29 has been securely welded along a helical line along the tube or rod, the other surface portions of the strip may be much more readily controlled and deflected to their desired final positions without irregular distortions or other difficulties. Even though the fin strip, as finally welded in place as shown in FIG. 4, is of generally L-shaped cross-section, it is initially formed as relatively flat, and accordingly it can be much more readily stored in coiled form or the like than would be possible if it were initially formed or shaped with a L-shaped cross-section. However, as indicated in FIG. 5, if desired, the L-shaped strip material, as indicated at 40, may be wound about a tube or rod, as at 41, while the base portions are being welded at a weld point or line, indicated at w, under engagement with a pressure roller, as at 42, and while the remaining portions of the strip are in upstanding positions, as indicated at 43. If the vertical dimension of the fin is not too high, this method may sometimes be possible.

FIG. 6 illustrates a method and means similar to that of FIG. 2, except that here a strip 26' is being advanced longitudinally to a weld region w where the edge portion 29' thereof comes into engagement with, and is welded to, an advancing metal workpiece 44, which may be either in the form of a flat plane, or, in some cases, possibly somewhat curved transversely or longitudinally. Here the high frequency current is applied by contacts 20', 21' from a source 33' to accomplish the welding in a manner similar to that explained in connection with FIG. 2 and beneath a pressure roller 34'. Then, after the edge 29' becomes welded in place, as the workpiece advances, suitably mounted guide means, as indicated by dot and dash lines at 45 and 45 respectively, may be provided to engage the strip for guiding and deflecting same from a generally horizontal plane to a generally vertical plane, as indicated at 47. The arrangement of FIG. 6 is particularly well adapted for welding slitted strip to extend longitudinally on an extended area of another workpiece or member, although this arrangement is also advantageous for use with unslitted strip material.

If the strip is slitted as per the arrangement of FIG. 6, after same has been welded in place, the various portions thereof which are separated by the slits, may be twisted or deflected to any desired relative positions in order to increase the exposed areas of contact with heat transfer fluid or for other purposes, or to increase the turbulence and rate of heat transference to or from such fluid. One example is indicated in FIG. 7, where certain portions of the strip, as at 48, 49, are deflected in opposite directions, whereas other portions, as at 50, are left straight and upstanding.

With the method as per FIG. 6, the strip initially may be entirely flat, as shown at 26', or, if preferred, marginal edge portions thereof may be deflected somewhat downwardly and into flat condition, as shown at 29 in FIG. 2, or such marginal portions, if preferred, may be deflected at right angles downwardly, as indicated at 51 on the strip 52, as shown in FIG. 8. The manner in which the strip in this form will then become welded in place on the member 53, will be readily apparent from the above descriptions of the other embodiments. After the strip is welded as per the method of FIG. 8, if same is slitted, then successive portions thereof, as indicated at 54 and 55, may be variously twisted or deflected for enhanced radiation or turbulence conditions, as above explained. Alternatively, as shown in the sectional view of FIG. 10, successive slit portions of the strip may be bent to various angularly spaced-apart positions, as shown at 56.

FIG. 11 merely shows an example of a strip of fin material 57 which is formed with slots, as at 58, slots of this nature being intended to be comprehended under the term "slits" as above used.

Although certain particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Method for welding and positioning with respect to a metal supporting member, an elongated metal fin strip which is transversely slit at spaced intervals except at one edge portion thereof, the slits extending from the opposite edge portion of said strip across the major portion of the width of the strip and to adjacent said one edge portion, said method comprising: rapidly advancing said member and said strip in a direction longitudinally of the strip, while bringing said one edge portion of the strip into contact with said member at a weld point and with said one edge portion and said member forming therebetween a substantially V-shaped gap with the opposite sides of said gap conforming to smooth paths in advance of the weld point, at least one of which paths is smoothly curved, and while maintaining the greater cross-sectional dimension of the strip, and a face thereof corresponding thereto, disposed, before and in passing the weld point, generally along and generally parallel to the surface of said member to which said one edge portion is to be welded and to one side of the said point; heating the opposite sides of said gap in advance of the weld point to welding temperature with current of a frequency of about 50,000 cycles per second or higher by supplying said current to points on said one edge portion and said member in advance of said weld point; applying pressure to said one edge portion of the strip at the weld point to bring same as thus heated into continuous welding engagement with said member; and after said one edge portion is welded to said member, deflecting at least predetermined ones of those portions of said strip between the slits, and other than said one edge portion as thus welded, away from said member and into outstanding relation to the surface of said member.

2. Method in accordance with the foregoing claim 1 and in which said one edge portion of the strip prior to its being brought into contact with said member, is depressed from the general plane of the remainder of the strip and toward said member.

3. Method in accordance with the foregoing claim 2 and in which said one edge portion is depressed into a position normal to said member and whereby the edge surface thereof becomes welded to the member.

4. Method in accordance with the foregoing claim 3 and in which the successive slitted portions, after the welding step, are deflected to different angular relationships to each other.

5. Method for welding and positioning an elongated metal fin strip which is transversely slit at spaced intervals except at one edge portion thereof in the form of generally helical convolutions surrounding a metal supporting member, the slits extending from the opposite edge portion of said strip across the major portion of the width of the strip and to adjacent said one edge portion, which method comprises: rapidly advancing said strip in a direction longitudinally of the strip, while bringing said one edge portion thereof into generally tangential contact with said member at a weld point, and while rotating the member and longitudinally advancing same, and with said one edge portion and said member forming therebetween a substantially V-shaped gap and with said one edge portion which forms one side of the gap conforming to a uniform predetermined smooth path in advance of and up to the weld point, and while maintaining the greater cross-sectional dimension of the strip, and a face thereof corresponding thereto, disposed, before and in passing the weld point relatively close and generally parallel to the surface of said member to which said one edge portion is to be welded and to one side of the weld point; heating the opposite sides of said gap in advance of the weld point to welding temperature with current of a frequency of about 50,000 cycles per second or higher by supplying said current to points on said one edge portion and said member in advance of said weld point; applying pressure to said one edge portion at the weld point and bringing same as thus heated into continuous welding engagement with said member; and after said one edge portion is welded to said member, deflecting at least predetermined ones of those portions of said strip between said slits, other than said one edge portion as thus welded, to positions forming outstanding helical fin convolutions on the surface of said member.

6. Method in accordance with the foregoing claim 5 and in which the successive slitted portions, upon deflection to outstanding positions, become separated at the slits from each other by angular gaps.

References Cited

UNITED STATES PATENTS

| 2,155,394 | 4/1939 | Berg et al. | 29—157.3 |
| 2,355,621 | 8/1944 | Brown | 113—118 X |
| 2,372,795 | 4/1945 | Rodeck | 113—118 |
| 3,047,712 | 7/1962 | Morris | 219—107 |
| 3,053,971 | 9/1962 | Busse | 219—107 |

FOREIGN PATENTS 971,316    1/1951    France.

CHARLIE T. MOON, *Primary Examiner.*